Sept. 3, 1940.   C. T. ANNÉ   2,213,798
REMOVAL OF ASPHALT FROM HYDROCARBON OIL
Filed June 18, 1938
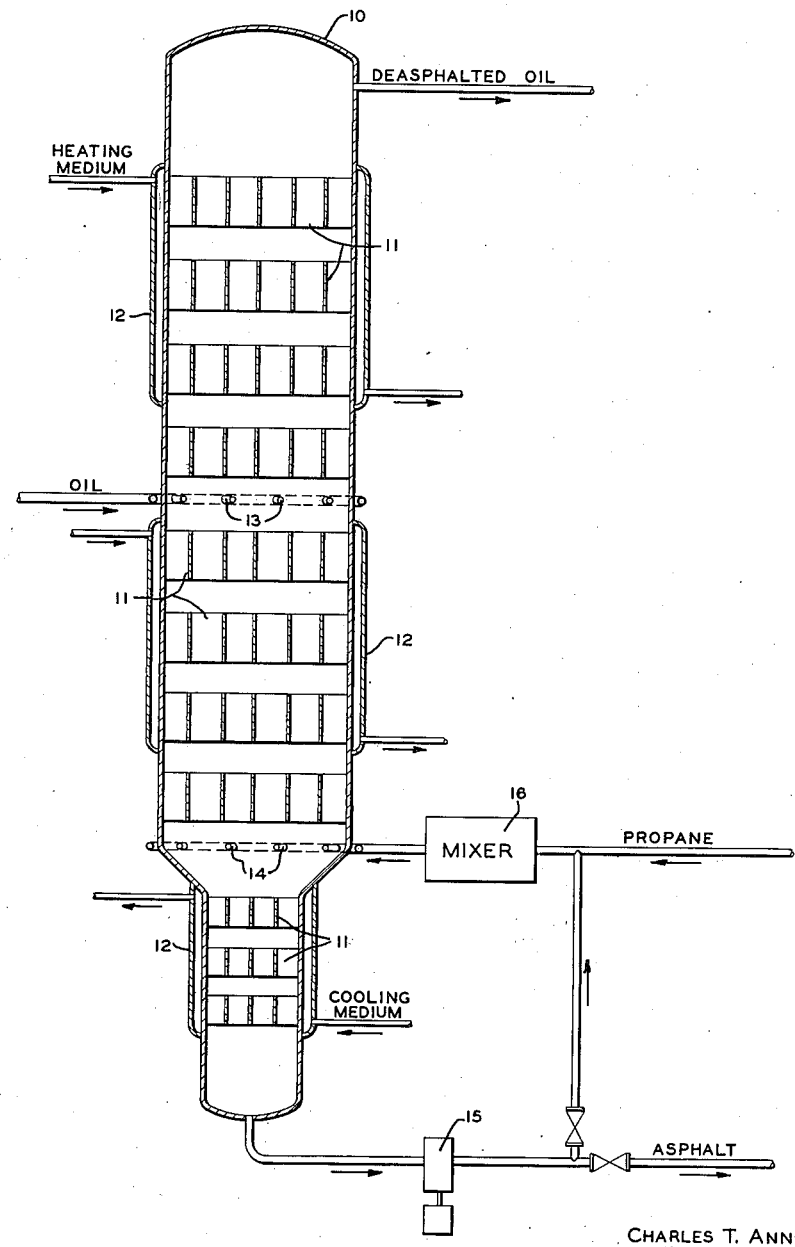
CHARLES T. ANNÉ
INVENTOR
BY R. J. Dearborn
Daniel Stryker
ATTORNEY Patented Sept. 3, 1940

2,213,798

UNITED STATES PATENT OFFICE 2,213,798

REMOVAL OF ASPHALT FROM HYDROCARBON OIL

Charles T. Anné, Port Arthur, Tex., assignor to The Texas Company, New York, N. Y., a corporation of Delaware Application June 18, 1938, Serial No. 214,487

3 Claims. (Cl. 196—13)

This invention relates to a method of removing asphalt from hydrocarbon oil and more particularly to the removal of asphalt from mineral lubricating oil stocks.

The invention broadly contemplates a continuous method of removing asphalt from hydrocarbon oil in the presence of a diluent liquid or solvent such as a liquefied normally gaseous petroleum hydrocarbon. The invention involves effecting continuous removal of asphalt from the oil in a separating vessel wherein the asphalt-bearing oil and solvent are subjected to countercurrent contact. The mixture is then continuously separated into phases, one of which comprises oil and solvent substantially free from asphalt, while the other comprises a mixture of asphalt and some solvent. These phases are continuously withdrawn from the separator. Advantageously, a portion of the withdrawn asphalt phase is recycled by commingling it with the fresh solvent entering the separating vessel.

The conventional method of asphalt removal usually involves a plurality of separate mixing and settling vessels so that the operation is of an intermittent type. It has been discovered, however, that asphalt can be satisfactorily removed from mineral lubricating oil by employing the countercurrent principle of operation, thereby reducing the number of operating vessels otherwise required and at the same time permitting a more simplified operation. It has also been found that the obtaining of a high degree of asphalt removal in a countercurrent operation is greatly facilitated by recycling a suitable proportion of the asphalt phase, and which will be described more fully below.

In order to further illustrate the method of this invention reference will now be made to the accompanying drawing:

Oil containing asphalt, as, for example, a residual lubricating oil fraction derived from Mid-Continent crude, is conducted from a source not shown and introduced to the upper portion of a separating vessel 10. The vessel 10 advantageously comprises a vertical tower and may be of restricted cross-sectional area in the lower section, as indicated.

This tower is provided with a plurality of grids 11 supported within the tower, one above the other. These grids are advantageously of the honeycomb type, each comprising, for example, a plurality of individual and parallel conduits or passages of restricted cross-sectional area and of comparatively short length. These conduits or passages are vertically arranged to provide for vertical flow of fluid therethrough.

Obviously, other forms of grid structure or of tower packing may be employed.

The vessel 10 is also advantageously provided with external jackets 12, through which a fluid heating or cooling medium may be circulated for the purpose of maintaining desired conditions of temperature throughout the vessel. It is, of course, contemplated that instead of employing external jackets, other means of regulating the temperature may be employed, as, for example, coils located within the vessel and through which heating or cooling fluids may be circulated.

The liquefied normally gaseous hydrocarbon, such as propane, is introduced to the vessel 10 at a point substantially below the point of oil introduction, as indicated.

Both the oil and propane are advantageously introduced through a plurality of nozzles 13 and 14, respectively. These nozzles, preferably, extend into the vessel 10 horizontally so as to discharge the oil or propane tangentially with respect to the inner wall of the vessel 10. In this way the liquid within the vessel at the point of oil or propane introduction is subjected to a swirling action for the purpose of realizing uniform distribution of the oil and propane through the grids or packing material.

The propane is introduced in the proportion of about eight parts of propane to one part of entering oil, although this ratio may vary from six to twenty parts of propane to one part of oil, for example.

The temperature at the top of the vessel may be maintained at around 150° F. or in the range of from 130 to 190° F., while the temperature at the bottom of the vessel is maintained at around 100° F., or in the range of from 100 to 170° F. The temperature at the middle of the vessel is maintained intermediate between the temperatures existing at the top and bottom of the vessel, respectively.

Operating in this way, the liquid accumulating near the top of the vessel 10 comprises oil and propane substantially free from asphalt.

The liquid accumulating in the bottom of the vessel is rich in asphalt. It is drawn off from the bottom of the vessel by means of a pump 15 and a suitable proportion of the asphaltic material so withdrawn is commingled with the entering propane in a mixer 16, from which the resulting mixture is introduced to the vessel through the nozzles 14, previously referred to. The amount of asphalt phase recycled is around $\tfrac{1}{10}$ to three volumes to one volume of oil entering the upper portion of the vessel.

The advantage gained by recycling the asphalt phase is illustrated by the following data obtained by deasphalting a mixed base residual lubricating oil stock in an apparatus substantially similar to that described above. The ratio of propane to residual oil was eight parts of propane to one part of oil. The temperatures in the vessel were maintained substantially the same in both instances and were around 152° F. in the top and middle portions of the vessel, and around 100° F. in the bottom of the vessel.

Run "A" was made without recycling of the asphalt phase, while Run "B" was made with recycling of the asphalt phase in the proportion of around three volumes of recycled material to one volume of entering oil:

|  | Run A | Run B |
| --- | --- | --- |
| Yield of deasphalted oil | 68.7 | 82.3 |
| Tests: |  |  |
| Saybolt Univ. vis. seconds at 210°F | 171 | 172 |
| Color, Tag. Rob | ½ | ⅞ |
| Carbon residue, percent | 2.32 | 2.10 |
| Asphalt residue: |  |  |
| Specific gravity | .986 | 1.012 |
| Saybolt furol vis. seconds at 210° F | 302 | 1553 |

Thus, from the foregoing results it is observed that by recycling a proportion of the asphalt phase, the yield of deasphalted oil, after removal of the solvent, was 82.3%, as compared with 68.7% without recycling; also, it is noted that the higher yield was accompanied by a slightly lower carbon residue content and a slightly better color, so that recycling not only improved the yield but also the quality of the oil.

The tests on the asphalt residues obtained in each run show a similar improvement in favor of recycling.

While mention has been made of a liquefied normally gaseous hydrocarbon as the diluent or solvent, it is contemplated that other deasphalting diluents or precipitants may be employed, as, for example, aliphatic alcohols, such as propyl, isopropyl, butyl or isobutyl alcohols, or mixtures thereof. Other solvents, such as acetone, may be employed.

It is also contemplated that conditions of solvent dosage, temperature and degree of recycling may vary from those mentioned above, and will depend upon the type of stock being treated, as well as upon the degree of refining action desired.

Obviously, many modifications and variations of the invention as hereinbefore set forth, may be made without departing from the spirit and scope thereof, and therefore only such limitations should be imposed as are indicated in the appended claims.

I claim:

1. A continuous method of removing asphalt from oil in the presence of a solvent comprising a solvent for oil adapted to precipitate asphaltic constituents, which comprises separately introducing the oil and solvent to a vertical separating vessel at points substantially removed from each other, subjecting the oil and solvent to countercurrent contact therein, forming an upper phase comprising oil and solvent substantially free from asphalt and a lower phase comprising mainly asphalt and some solvent, continuously withdrawing said phases and commingling a portion of the withdrawn asphalt phase with solvent entering the separating vessel.

2. In the deasphalting of hydrocarbon oil by precipitation of asphalt from a mixture of the oil and a solvent comprising propane, the continuous method of removing the asphalt from the oil which comprises introducing the oil to the upper portion of a separating vessel, introducing the solvent thereto at a point substantially below the point of oil introduction, maintaining the top of the vessel at a temperature of around 150° F., maintaining the bottom of the vessel at a temperature of around 100° F., removing from the top of the vessel oil substantially free from asphalt, forming in the bottom of said vessel a mixture comprising asphalt and some solvent, withdrawing said mixture and continuously commingling a portion of said mixture with the solvent entering the separating vessel.

3. In the deasphalting of hydrocarbon oil by precipitation of asphalt from a mixture of the oil and a solvent comprising propane, the continuous method of removing the asphalt from the oil which comprises introducing the oil containing asphalt to about the mid-portion of a vertical packed tower, introducing the solvent to the tower at a point substantially midway between the point of feed oil introduction and the bottom of the tower, continuously removing from the top of the tower oil substantially free from asphalt and mixed with the bulk of the solvent, continuously withdrawing from the bottom of the tower a mixture comprising asphalt and some solvent, and continuously introducing a portion of said withdrawn mixture to the tower at about the point of solvent introduction, the amount so recycled being from about one-third to three times the feed oil by volume.

CHARLES T. ANNÉ.